(12) United States Patent
Chang et al.

(10) Patent No.: US 11,044,401 B1
(45) Date of Patent: Jun. 22, 2021

(54) PANORAMIC CAMERA CAPABLE OF ACQUIRING A REGION OF PARTICULAR INTEREST IN A PANORAMIC IMAGE

(71) Applicant: TRIPLE WIN TECHNOLOGY(SHENZHEN) CO.LTD., Shenzhen (CN)

(72) Inventors: Liang-Kao Chang, New Taipei (TW); Yu-An Cho, New Taipei (TW)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 0 days.

(21) Appl. No.: 16/843,111

(22) Filed: Apr. 8, 2020

(30) Foreign Application Priority Data

Jan. 10, 2020 (CN) .......................... 202010026956.4

(51) Int. Cl.
  *H04N 7/00* (2011.01)
  *H04N 5/232* (2006.01)
  *H04N 5/247* (2006.01)
  *H04N 5/225* (2006.01)
  *G06T 3/40* (2006.01)

(52) U.S. Cl.
  CPC ....... *H04N 5/23238* (2013.01); *G06T 3/4038* (2013.01); *H04N 5/2258* (2013.01); *H04N 5/23296* (2013.01); *H04N 5/247* (2013.01); *G06T 2207/20081* (2013.01); *G06T 2207/20104* (2013.01)

(58) Field of Classification Search
  CPC .. H04N 5/23238; H04N 5/2258; H04N 5/247; H04N 5/23296; G06T 3/4038; G06T 2207/20081; G06T 2207/20104

USPC .......................................................... 348/36
See application file for complete search history.

(56) References Cited

U.S. PATENT DOCUMENTS

| | | | | |
|---|---|---|---|---|
| 9,521,398 | B1* | 12/2016 | Woodman | H04N 13/286 |
| 10,877,649 | B2* | 12/2020 | Fujita | G06F 3/011 |
| 2015/0161171 | A1* | 6/2015 | Thankavel | G06F 16/5846 705/14.73 |
| 2015/0180914 | A1* | 6/2015 | Welinder | G06F 11/2082 715/758 |
| 2015/0297949 | A1* | 10/2015 | Aman | G06T 7/246 348/157 |
| 2018/0376121 | A1* | 12/2018 | Wang | H04N 5/232939 |
| 2019/0158737 | A1* | 5/2019 | Hsu | H04N 5/23241 |

(Continued)

FOREIGN PATENT DOCUMENTS

TW    I287402 B    9/2007

*Primary Examiner* — Gims S Philippe
(74) *Attorney, Agent, or Firm* — ScienBiziP, P.C.

(57) ABSTRACT

A panoramic camera includes a casing, at least two independent camera units fixed on the casing, a first image processor electrically connected to each image sensor, and a device to sense level of ambient light. The camera units acquire images captured by each of the camera units and can stitch the images together to form a panoramic image. A second image processor is electrically connected to the first image processor, the second image processor obtains the panoramic image from the first image processor and by training or deep learning can focus on and zoom into a region of particular interest (ROPI) in the panoramic image. The ROPI can be edited and clipped out and the clipped images can be synthesized to form close-up images of the ROPI.

11 Claims, 3 Drawing Sheets

(56) References Cited

U.S. PATENT DOCUMENTS

2019/0205616 A1* 7/2019 Hong ................. G06K 9/00228
2019/0208142 A1* 7/2019 Kitaya ............... H04N 5/23293

* cited by examiner

PANORAMIC CAMERA CAPABLE OF ACQUIRING A REGION OF PARTICULAR INTEREST IN A PANORAMIC IMAGE

The subject matter herein generally relates to cameras, in particular relates to a panoramic camera capable of acquiring a region of interest in a panoramic image.

BACKGROUND

Surveillance cameras are deployed in transportation hubs such as large commercial supermarkets, parking lots, railway stations, and airports, as well as at various points in the city, and are continuously working for 24 hours. The number of surveillance videos has exploded. Surveillance videos play an increasingly important role in practical applications such as intelligent security, traffic management, and criminal investigations. Therefore, concise and information-rich surveillance videos are of great value for storage and viewing.

However, lengthy surveillance videos occupy a lot of space in storage, and browsing unnecessary information in the videos wastes labor and time. Obtaining more compact and more information-intensive videos would improve the work efficiency of monitoring personnel, save labor costs, and greatly reduce the storage and memory requirements. To a certain extent, it is more suitable for the explosive development of information in modern society. Video condensing technology is a current focus of academic and industrial circles.

In the prior art, obtaining a region of particular interest from a surveillance video requires manual application, wasting labor and time.

BRIEF DESCRIPTION OF THE DRAWINGS

Implementations of the present technology are described, by way of embodiments, with reference to the attached figures.

DETAILED DESCRIPTION

Figure 1:
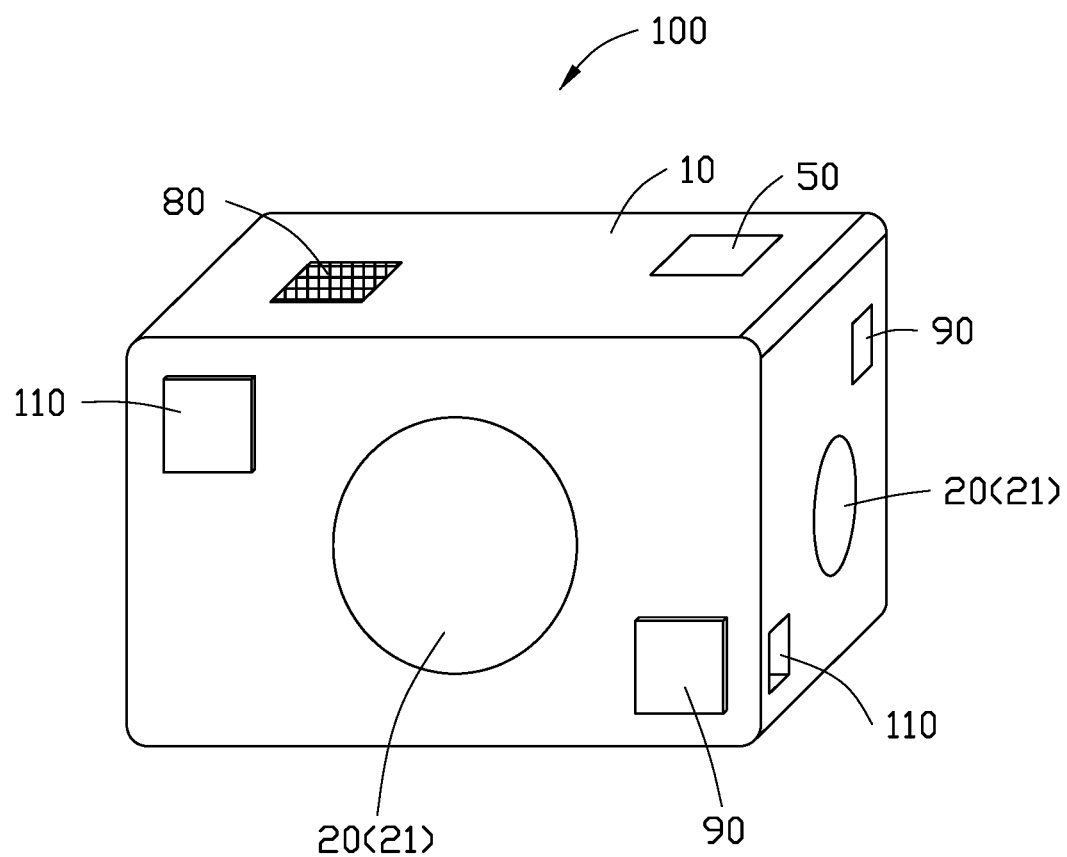
FIG. 1 is a schematic diagram of a panoramic camera in accordance with one embodiment.
Figure 2:
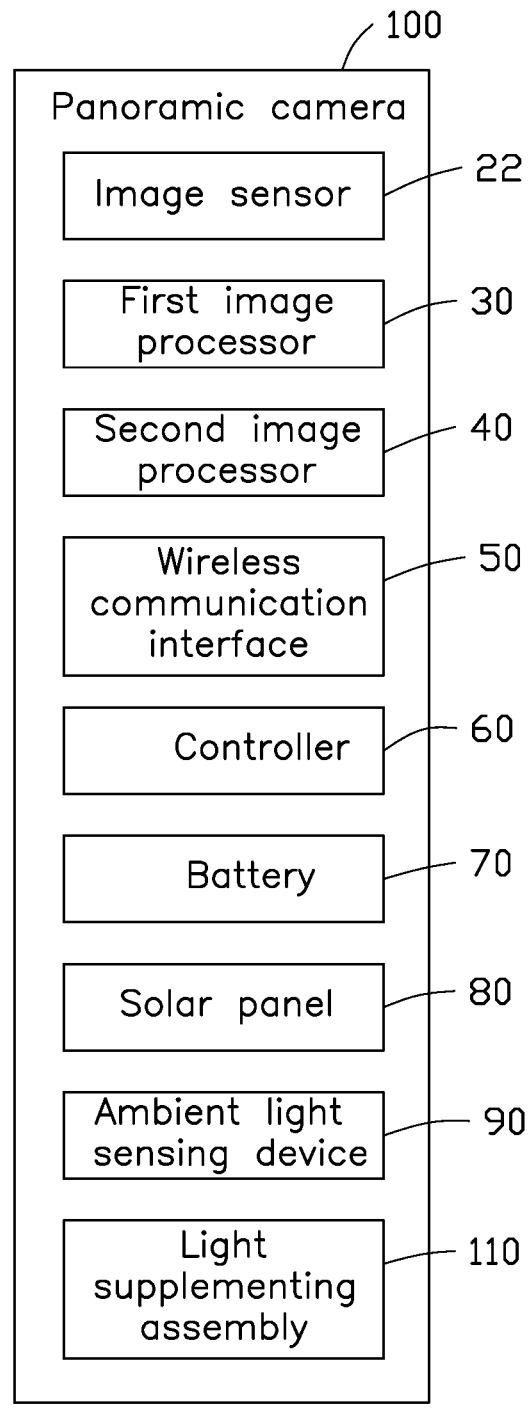
FIG. 2 is function block of the panoramic camera in FIG. 1.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain portions may be exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like. The references "a plurality of" and "a number of" mean "at least two."

FIG. 1 illustrates a camera (panoramic camera 100) according to a first embodiment. The panoramic camera 100 is capable of acquiring a region of particular interest in a panoramic image. The panoramic camera 100 includes a casing 10, at least two camera units 20 fixed on the casing 10, a first image processor 30, a second image processor 40, a wireless communication interface 50, a controller 60 inside the casing 10, a battery 70, a solar panel 80, an ambient light sensing device 90, and a supplementary light component 110 fixed on the casing 10.

The casing 10 is substantially square. A material of the casing 10 may be a metal with high thermal conductivity, such as aluminum or copper, so as to improve heat dissipation. A heat sink (such as graphene) can be attached to the casing 10 to further improve the heat dissipation.

Each camera unit 20 includes a lens 21 and an image sensor 22 located on a light path of the lens 21, each lens 21 collects light of a scene within its shooting range. Each camera unit 20 can be independently controlled by a mobile terminal for example. A field of view (FOV) of each lens 21 is different, this enables different shooting ranges, and the panoramic camera 100 can cover a 360 degree or 720 degree FOV.

Each image sensor 22 is configured to receive light collected by a corresponding lens 21 and form an image. In this embodiment, each lens 21 may be connected with a fish-eye lens to increase the FOV. The first image processor 30 is electrically connected to each camera unit 20.

In the embodiment, the first image processor 30 is electrically connected to each image sensor 22 comprised in the camera unit 20. The first image processor 30 acquires images captured by each of the camera units 20 and can stitch the images together to form a single panoramic image.

The second image processor 40 is electrically connected to the first image processor 30. The second image processor 40 obtains the panoramic image from the first image processor 30 and can query a region in the panoramic image, edit the region in the panoramic image, and synthesize the clipped image to form a close-up image.

Figure 3:
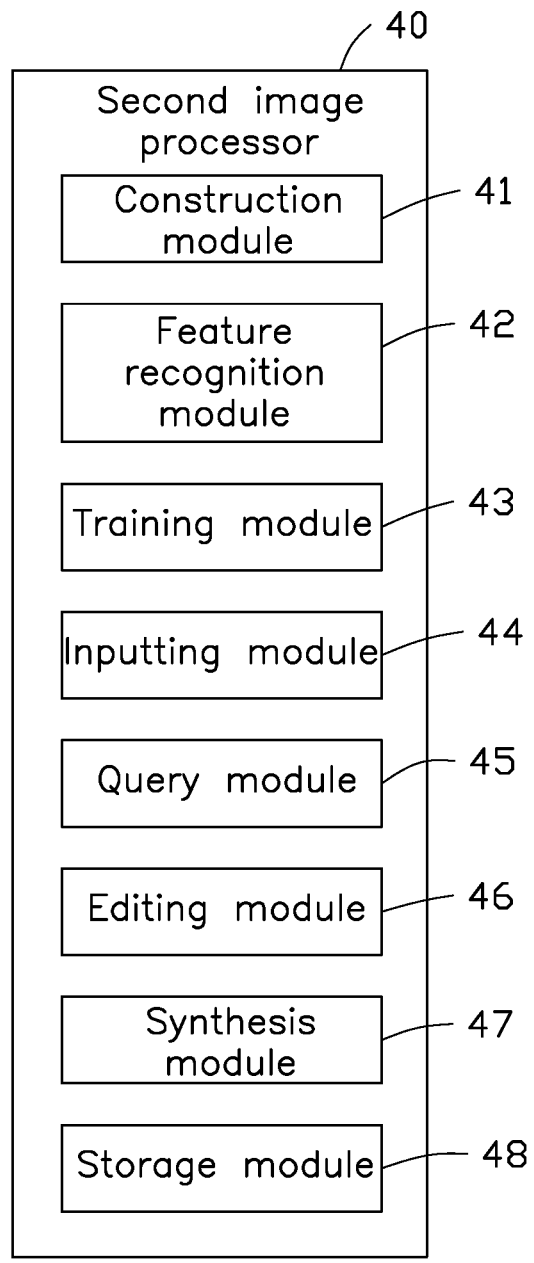
FIG. 3 is a flowchart of a method for controlling panoramic camera.

Referring to FIG. 3, in this embodiment, the second image processor 40 includes a construction module 41, a feature recognition module 42, a training module 43, an inputting module 44, a query module 45, an editing module 46, a synthesis module 47, and a storage module 48.

The constructing module 41 is configured to construct a sample image set of a region of particular interest (ROPI). The sample image set may be a human face, a feature of a vehicle, a part of a vehicle, or an animal, a weather condition, or the like. Some parts of a vehicle can be features on the vehicle, for example, license plates, tires, and lights.

Among the multi-frame video pictures included in the panoramic image, some picture frames include a ROPI, and some picture frames do not include a ROPI.

The feature recognition module 42 is configured to identify within each frame of the video picture a ROPI, and delete picture frames that do not include a ROPI.

The training module 43 is configured to train the feature recognition module 42 through deep learning or machine learning according to the sample image set, so that the feature recognition module 42 can autonomously classify targets and identify a target object.

The input module 44 is configured to input the panoramic image into the feature recognition module 42. The panoramic image includes multiple frames of video pictures.

The query module 45 is configured to detect a position of the ROPI in a video picture of each frame by the feature recognition module 42 and mark the position of the ROPI in the picture of each frame.

The editing module 46 is configured to cut out the ROPI marked in the video picture of each frame.

The composition module 47 synthesizes the clipped multiple frames of ROPIs in chronological order into close-up images.

The storage module 48 is configured to store the close-up image and/or the panoramic image. Preferably, it is used to store the close-up images, which can save storage space compared to storing complete panoramic images. In this way, a user can quickly obtain a close-up image of the ROPI in the panoramic image.

The wireless communication interface 50 is configured to receive a remote control instruction sent by for example a mobile terminal. The remote control instruction includes at least one camera unit 20 to be controlled and a type of operation to be performed by the camera unit 20.

A remote control instruction may be send to the panoramic camera 100 through a mobile terminal, to control the camera unit 20 generally and to perform a task. The mobile terminal may be a remote controller, a smart phone, a tablet computer, and so on. The types of operation include, but are not limited to, zoom in, zoom out, adjust focus, adjust aperture, and the like.

The panoramic camera 100 can be switched between a remote control mode and a manual mode. When the panoramic camera 100 is in a remote control mode, each lens of the camera unit 20 can be independently controlled by a remote control instruction to perform an operation.

The controller 60 is electrically connected to the wireless communication interface 50. The controller 60 is configured to analyze the remote control instruction and control the corresponding camera unit 20 to perform an operation according to an analysis. That is, a focal length of one camera unit 20 can be adjusted by pressing a key of a mobile terminal, and sending the remote control instruction to adjust the focal length of the camera unit 20.

The battery 70 is configured to provide power to the panoramic camera 100 when the panoramic camera 100 is operating. More specifically, the battery 70 may be a rechargeable battery. In the above embodiment, each camera unit 20 has a battery 70, or different camera units 20 can share one battery 70. The panoramic camera 100 can further include a power line from an external power supply.

When the panoramic camera 100 is used outdoors, the solar panel 80 can convert absorbed light into electrical energy, and feed the electrical energy to the battery 70.

The lens 21 can be switched between a normal mode and a night vision mode. Specifically, an infrared filter (not shown) is disposed on the lens 21. When the lens 21 is in the normal mode, the filter is opened to block near and far infrared light from entering the image sensor 22, that is, the image sensor 22 should only sense visible light. The infrared filter stops working in night vision mode, so that infrared can enter the image sensor 22 and form an image.

The ambient light sensing device 90 is fixed on the casing 10; and the ambient light sensing device 90 is configured to detect intensity of ambient light around the camera unit 20.

The panoramic camera 100 further includes a light supplementing assembly 110 connected to the controller 60. The controller 60 can turn the light supplementing assembly 110 on or off according to a detection made by the light sensing device 90. The light supplementing assembly 110 may be an LED or other light-emitting device.

The panoramic camera 100 can obtain a panoramic image, and since it is a panoramic image, it can track the trajectory or real-time situation of the target at all times without missing the whole or key parts of the target. An intelligent searching for a ROPI in the panoramic image can be performed, so that a close-up image of a ROPI can be obtained automatically, avoiding the time-consuming and labor-intensive shortcomings of manual search, editing, and composition. Efficiency is improved.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the portions within the principles of the present disclosure, up to and including the full extent established by the broad general meaning of the terms used in the claims. It will therefore be appreciated that the embodiments described above may be modified within the scope of the claims.

What is claimed is:

1. A panoramic camera, comprising:
   a casing;
   at least two camera units fixed on the casing;
   a first image processor is electrically connected to each image sensor and configured to acquire images captured by each of the camera units and stitch the images to form a panoramic image; and
   a second image processor is electrically connected to the first image processor, the second image processor is configured to obtain the panoramic image from the first image processor and query a region of interest in the panoramic image, edit the region of interest in the panoramic image, and synthesize the edited image to form a close-up image;
   wherein the second image processor comprises:
      a construction module configured to construct a sample image set of a region of interest;
      a feature recognition module configured to identify whether each frame of the video picture contain a region of interest and delete picture frames that do not include the region of interest; and
      a training module configured to train the feature recognition module through deep learning or machine learning according to the sample image set;
      an input module for inputting the panoramic image into the feature recognition module;
      a query module configured to detect a position of the region of interest in a video picture of each frame by the feature recognition module and mark the position of the region of interest in the picture of each frame.

2. The panoramic camera of claim 1, wherein
   the second image processor further comprises an editing module configured to cut out the region of interest marked in the video picture of each frame.

3. The panoramic camera of claim 2, wherein
the second image processor further comprises a composition module synthesizes the clipped multiple frames of the region of interest images in chronological order into the close-up images.

4. The panoramic camera of claim 3, wherein
the second image processor further comprises a storage module configured to store the close-up image and/or the panoramic image.

5. The panoramic camera of claim 4, wherein
each camera unit is able to be independently controlled by mobile terminal.

6. The panoramic camera of claim 5, wherein further comprises a wireless communication interface configured to receive a remote control instruction sent by mobile terminal.

7. The panoramic camera of claim 6, further comprises a controller electrically connected to the wireless communication interface, the controller is configured to analyze the remote control instruction and control the corresponding camera unit to perform an operation according to the analysis result.

8. The panoramic camera of claim 7, wherein the remote control instruction comprises at least camera unit to be controlled and a type of operation performed by the camera unit, and the type of operations is select from zoom in, zoom out, adjusting focus, and adjusting aperture.

9. The panoramic camera of claim 7, further comprises an ambient light sensing device fixed on the casing.

10. The panoramic camera of claim 9, further comprises a light supplementing assembly electrically connected with the ambient light sensing device and the controller.

11. The panoramic camera of claim 1, further comprises a solar panel and a battery electrically connected to the battery, wherein the solar panel is able to absorb sunlight and convert the absorbed sunlight into electrical energy, and then output the electrical energy to the battery.

* * * * *